UNITED STATES PATENT OFFICE.

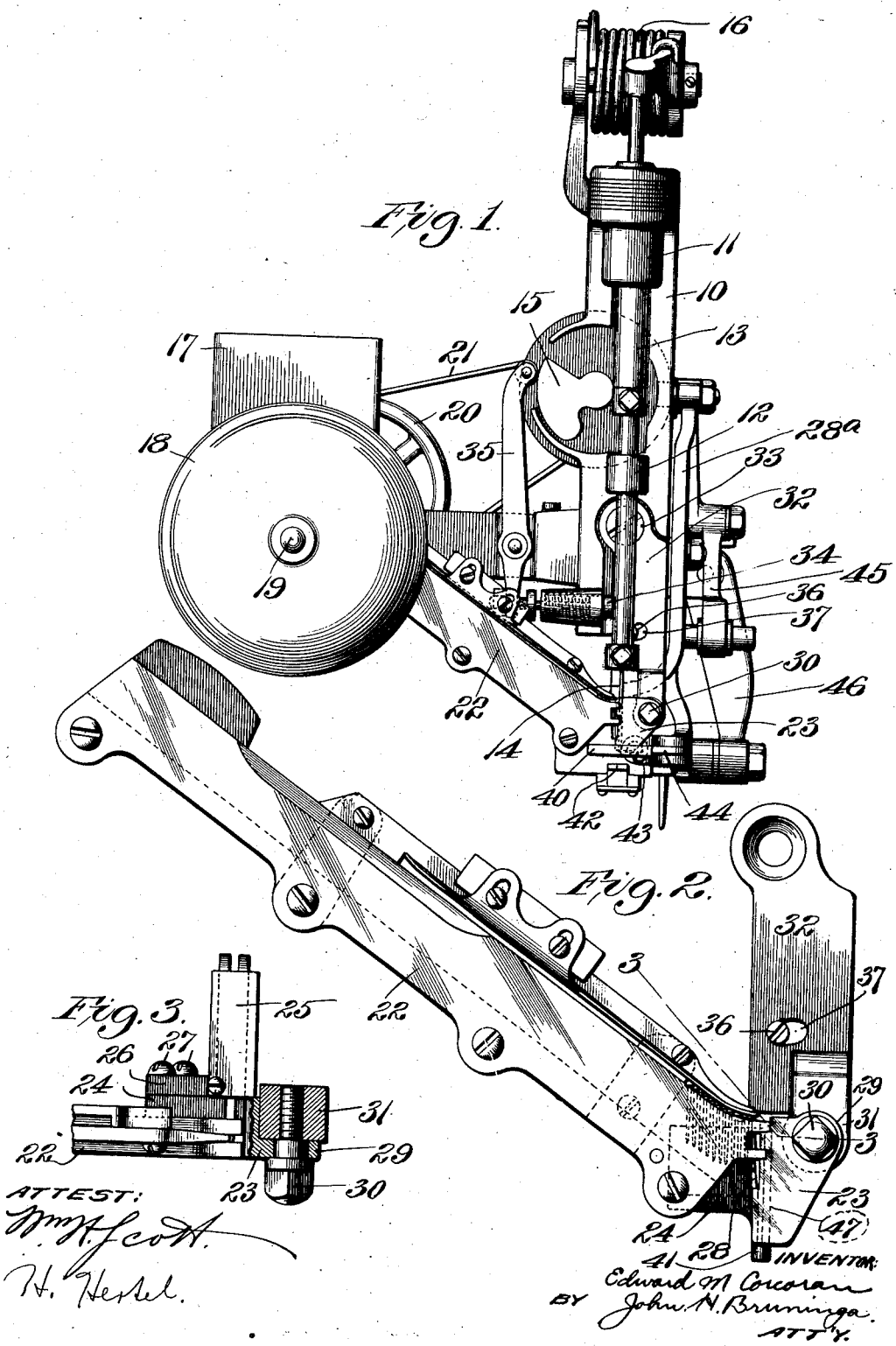

EDWARD M. CORCORAN, OF ST. LOUIS, MISSOURI, ASSIGNOR TO CHAMPION SHOE MACHINERY COMPANY, OF ST. LOUIS, MISSOURI, A CORPORATION OF MISSOURI.

NAILING-MACHINE.

1,026,021.   Specification of Letters Patent.   Patented May 14, 1912.

Application filed December 17, 1910. Serial No. 597,910.

*To all whom it may concern:*

Be it known that I, EDWARD M. CORCORAN, a citizen of the United States, and residing at St. Louis, in the State of Missouri, have invented certain new and useful Improvements in Nailing-Machines, of which the following is a specification.

This invention relates to nailing machines, and is an improvement on the machines shown in a copending application of Stephen A. Dobyne, Serial No. 593,330.

One of the objects of this invention is to construct a machine of the above type, in which the nails or fasteners may be fed to the driver without liability of clogging, and in which the mechanism will be simple in construction, cheap to manufacture, and easy to assemble and disassemble.

Another object is to provide a guide for the nail separator and to mount this guide in a simple and effective manner.

Further objects will appear from the detail description taken in connection with the accompanying drawings in which:

Figure 1 is a front elevation of a nailing machine head showing this invention applied thereto, Fig. 2 is a detail of the raceway, nail block and the support, and Fig. 3 is a section on the line 3—3 Fig. 2.

The machine to which this invention is shown as applied is substantially as shown in the application referred to, and is of a type known as "loose nailers" in which ready formed nails or fasteners are fed and driven, although the invention is not necessarily limited to that specific type.

Referring to the accompanying drawing, 10 designates a stationary machine head, which is provided with stationary guides 11 and 12 for a driver bar 13 having a driver 14. The driver is raised by means of a cam 15 on the main shaft, and is driven down by means of a spring 16 when released by the cam. A nail loader, comprising a hopper 17, and a rotary drum 18 secured to a shaft 19 which is driven by a pulley 20 and a belt 21 from the main shaft, supplies the raceway 22 with nails, substantially as shown and described in the application referred to.

The raceway 22 is mounted to slide in suitable guides in the loader and has rigidly secured at its lower end a nail block or throat piece 23 which is provided with a driver passage or throat for the nails and the driver. The nail block has formed thereon a lug 24, and a separator guide 25 is provided with a lug 26, and fastenings such as screws 27 rigidly secure the raceway, nail block and separator guide together. A separator 28 of well known construction moves in the guide 25 and through slots formed in the adjacent faces of the raceway and the nail block, and is actuated by means of a cam lever 28$^a$ having a cam roll engaging a cam on the main shaft. The nail block is provided with an ear 29 arranged to receive a screw 30 which is threaded into the ear 31 on a link or support 32 pivoted at 33 in a recess formed in the machine head. A spring actuated plunger 34 engages one side of the link and the spring is assisted by a cam lever 35 engaging the cam 15. The movement of the link or support 32 to the right is limited by a stop 36 on the head engaging a slot 37 in the link.

A presserfoot or plate 40 is secured to the machine head and is provided with a transverse slot arranged to receive the projection 41 on the nail block and the awl 43. The awl is supported in an awl carrier 44, which is operated to cause the awl to puncture the work by a cam actuated lever 45, and is moved laterally so as to feed the work by means of a cam actuated lever 46, as described in the application referred to.

42 is a gage for gaging the distance of the row of fasteners or nails from the edge of the work.

The operation of the machine will be obvious from the drawing and from the application referred to. It will be understood that the work is supported on a horn and pressed against the presserfoot. After a nail has been driven, and after the hammer has been raised so as to clear the throat or driver passage in the nail block, the awl will puncture the work and will be moved laterally so as to feed it to the left underneath the presserfoot. As the awl moves to the left it will engage a shoulder 47 at the rear of the nail block and carry the nail block and raceway with it to the left, the raceway sliding in the tack loader, this movement of the parts being permitted due to the linkage connection supporting the nail block and raceway from the machine head. As the awl moves back, the spring actuated plunger will move the link or support 32 to the right so as to place the nail throat or passage in alinement with the driver, which is then released by its cam to drive the nail which has been separated and fed into the throat or passage by the separator. The purpose of the lever 35 is to prevent sticking of the link or support 32.

In accordance with this invention the raceway and the nail block comprise a substantially rigid and one piece construction. This prevents the formation of a crack between the end of the raceway and the nail block as in former constructions. In former constructions it sometimes happened that the nail would enter such a crack, especially if the crack opened and closed during the operation of the machine, which resulted in clogging of the nails. In this construction, however, the joints may be close and accurate, and in fact, the raceway and nail block may be of one single and integral piece. By rigidly securing the raceway, the nail block and the separator guide together, an accurate alinement of the separator with the recesses in the nail block and raceway can be obtained. By constructing the awl so that it has an independent work feeding movement it is not necessary to reciprocate a heavy head as in prior constructions. Due to the resulting lightness of the moving parts, the inertia of those parts and therefore the wear on the bearings and vibration is reduced to a minimum.

It is obvious that various changes may be made in the details of construction without departing from this invention, and it is therefore to be understood that this invention is not to be limited to the specific construction shown and described.

Having thus described the invention what is claimed is:

1. In a nailing machine, the combination with a head, and a driver and a nail loader thereon, of a raceway movable in said loader and having a nail block rigidly connected thereto at its lower end, and means for moving said nail block into and out of alinement with said driver.

2. In a nailing machine, the combination with a head, and a driver and a nail loader thereon, of a raceway having a nail block rigidly secured thereto to form a part thereof, means for supporting said raceway and nail block for transverse movement on said head, and means for reciprocating said raceway and nail block transversely in the line of feed of the work to move the nail block into and out of alinement with the driver.

3. In a nailing machine, the combination with a head and a driver thereon, of a raceway having a nail block thereon, a supporting member mounted for transverse movement on said head, and means for pivotally connecting said raceway and nail block to said supporting member.

4. In a nailing machine, the combination with a head and a driver thereon, of a raceway having a nail block thereon, and a link pivotally connected to said head and said nail block for supporting said raceway and nail block for transverse movement on said head.

5. In a nailing machine, the combination with a stationary head having guides and a driver in said guides, of a raceway having a nail block rigidly secured to its lower end, a transversely movable support on said head, and means for connecting said nail block to said support to move therewith in the line of feed of the work.

6. In a nailing machine, the combination with a head and a driver thereon, of a raceway having an ear thereon, a link pivotally connected to said head and ear, and means for reciprocating said raceway.

7. In a nailing machine, the combination with a head, a driver thereon, and a nail loader, of a raceway sliding in said loader and having a nail block rigidly secured thereto at its lower end, and means for supporting said nail block for transverse movement on said head.

8. In a nailing machine, the combination with a head, a driver thereon, and a nail loader, of a raceway sliding in said loader and having a nail block rigidly secured thereto at its lower end, and a link connected to said nail block and said head for supporting said nail block and raceway on said head for transverse movement with respect to said driver.

9. In a nailing machine, the combination with a head and a driver thereon, of a raceway having a nail block thereon, an ear on said block, and a link connecting said ear to said head to support said nail block and raceway on said head for transverse movement with respect to said driver.

10. In a nailing machine, the combination with a head and a driver thereon, of a raceway having a nail block rigidly secured thereto to form a part thereof, means for mounting said raceway and nail block on said head to reciprocate transversely thereon, an awl carrier mounted for transverse work feeding movement on said head, and means operated through the awl carrier for operating the raceway and nail block.

11. In a nailing machine, the combination with a head and a driver thereon, of a raceway having a nail block rigidly secured thereto to form a part thereof, means for mounting said raceway and nail block on said head to reciprocate transversely thereon, and an awl carrier mounted for transverse work feeding movement on said head and operating to engage said nail block to move it in one direction.

12. In a nailing machine, the combination with a head and a driver thereon, of a raceway thereon having a nail block at its lower end, means for supporting said raceway and nail block for transverse movement on said head, a nail separator, a guide for said separator, and means for rigidly securing said raceway nail block and guide together.

In testimony whereof I affix my signature in presence of two witnesses.

EDWARD M. CORCORAN.

Witnesses:
J. H. BRUNINGA,
G. H. HESSING.

Copies of this patent may be obtained for five cents each, by addressing the "Commissioner of Patents, Washington, D. C."